United States Patent

Walley et al.

[19]

[11] Patent Number: 4,588,505

[45] Date of Patent: May 13, 1986

[54] WATER SCAVENGER POUCH

[75] Inventors: David H. Walley, Stillwater; James C. Fitch, Tulsa, both of Okla.

[73] Assignee: Frontier Technology, Inc., Muskogee, Okla.

[21] Appl. No.: 608,028

[22] Filed: May 7, 1984

[51] Int. Cl.[4] .............................................. B01D 27/02
[52] U.S. Cl. .................... 210/502.1; 206/204; 34/95
[58] Field of Search ............... 210/500.1, 500.2, 503, 210/507, 282, 502.1; 73/61.1 R; 206/204; 34/95; 502/400

[56] References Cited

U.S. PATENT DOCUMENTS

| | | | |
|---|---|---|---|
| 3,441,140 | 4/1969 | Thurber | 210/282 |
| 3,744,639 | 7/1973 | Teeple, Jr. et al. | 210/282 |
| 3,745,659 | 7/1973 | Hsu | 210/502.1 |
| 3,935,099 | 1/1976 | Weaver et al. | 210/702 |
| 3,951,812 | 4/1976 | Hsu | 210/502.1 |
| 4,124,116 | 11/1978 | McCabe, Jr. | 210/502.1 |
| 4,160,059 | 7/1979 | Samejima | 210/504 |
| 4,242,206 | 12/1980 | Estabrooke | 210/502.1 |

Primary Examiner—Richard V. Fisher
Assistant Examiner—Wanda L. Millard
Attorney, Agent, or Firm—Head, Johnson & Stevenson

[57] ABSTRACT

A water absorption pouch comprising an open-mesh, hydrocarbon impervious, cloth (e.g., nylon, polypropylene, fiberglass) container confining a water absorbent polymer phase (e.g., mixture of an alkali metal base hydrolyzed starch/acrylonitrile copolymer or alkali metal alkylcarboxamide and a carboxylmethyl or hydroxyethyl cellulose) and sufficient ballast to make the pouch settle to the bottom of a hydrocarbon liquid. Such a water absorption pouch can be tethered and lowered to the bottom of a hydrocarbon containing vessel to absorb a low lying water phase and then removed, dehydrated by squeezing and reused repeatedly.

2 Claims, 2 Drawing Figures

WATER SCAVENGER POUCH

BACKGROUND OF THE INVENTION

1. Field of the Invention

This invention relates to a highly absorbent pouch useful in removing condensed, entrained and/or emulsified water from hydrocarbon fuels or oils. More specifically, this invention relates to an open-mesh fabric pouch confining a blend of superabsorbent polymers capable of being lowered to the bottom of a hydrocarbon container vessel and then absorbing many times its weight of water in the presence of the hydrocarbon and subsequently being removed, squeezed or compressed to expel water and then reused repeatedly.

2. Description of the Prior Art

It is generally known that hydrocarbon fuel and oil storage containers, particularly containers that are vented to the atmosphere and frequently experience liquid level changes, collect water through naturally occurring condensation and inherent hydroscopic attraction. Thus, it is not uncommon for more than an inch of water to accumulate in the bottom of the container. It is also generally known and well accepted that water contamination of hydrocarbon liquids frequently represents a serious problem. For example, in hydrocarbon fuels (gasoline, diesel, heating oil, etc.), water may seriously reduce combustion efficiency, produce noxious fumes and smoke and potentially result in catastrophic mechanical failure. In lubricating oil and the like, water contamination can be a severe detriment to performance by reducing lubrication which in turn can accelerate wear to costly bearings and other moving parts.

Various methods and techniques have been historically employed to compensate for or alleviate the problems associated with condensed, entrained and/or emulsified water contaminants in hydrocarbon fluids. For example, various desiccants and varities of scavenger agents have been suggested and employed as well as the addition of costly solvents to solubilize the water. Furthermore, it is generally known to provide costly auxiliary equipment to hydrocarbon storage facilities and the like to facilitate the removal of the water phase. However, the need for an inexpensive yet reliable method of reducing condensed and entrained water contamination of hydrocarbon liquids wherein the method is generally applicable to virtually any hydrocarbon vessel or equipment still exists.

SUMMARY OF THE INVENTION

In view of the need for an inexpensive, yet reliable method of removing condensed and/or entrained water from hydrocarbon fuel/oil storage containers, we have discovered a novel water absorption pouch adapted to absorb a free, entrained or condensed water phase settling out of a hydrocarbon liquid comprising:
  (a) an open-mesh, hydrocarbon impervious, cloth container confining a water absorbent polymer and ballast;
  (b) a water absorbent polymer phase confined within the open-mesh cloth container; and
  (c) sufficient ballast confined within the open-mesh cloth container to make the pouch settle to the bottom of a hydrocarbon liquid.

Thus, according to the present invention, the highly water absorbent pouch can be tethered such that the pouch can be lowered to the bottom of a hydrocarbon containing vessel whereby the low lying water layer can be absorbed by the polymer phase which swells to the full volume of the fabric container. The pouch can then be retrieved, dehydrated (e.g., squeezed) and subsequently reused. In one embodiment of the present invention, the highly water absorbent polymer phase is selected from the group consisting of an alkali metal base hydrolyzed starch/acrylonitrile copolymer and an alkali metal alkylcarboxamide copolymer mixed with a carboxymethyl cellulose (CMC) or hydroxyethyl cellulose wrapped in a polypropylene mesh and confined to an open-mesh nylon pouch.

It is an object of the present invention to provide an inexpensive yet reliable water absorption pouch which can be lowered to the bottom of a hydrocarbon containing vessel and then absorb a condensed or entrained water phase settled out of the hydrocarbon or an emulsified, circulating water phase. It is an additional object of the present invention to provide a pouch that can be withdrawn from the hydrocarbon, dehydrated by squeezing or the like and then reused. Fulfillment of these objects and the presence and fulfillment of additional objects will be apparent upon complete reading of the specification and claims taken in conjunction with the attached drawings.

DESCRIPTION OF THE PREFERRED EMBODIMENTS

Figure 1:
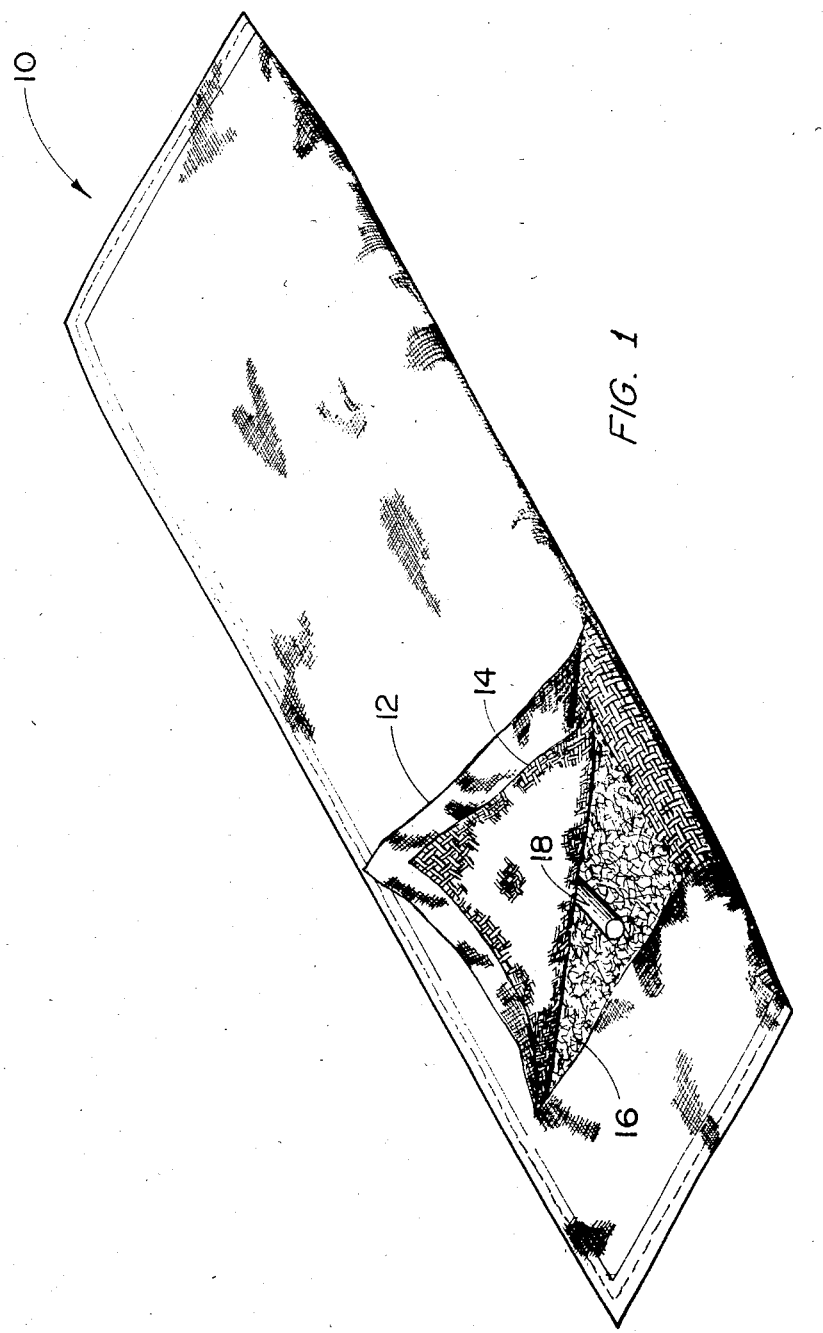
FIG. 1 illustrates a partial cross-sectional view of a water absorbent pouch according to the present invention.

The water absorption pouch according to the present invention, how it is made and used, the advantages of its use and how it differs from the prior art devices can perhaps be best explained and understood by reference to the attached drawing. As illustrated in FIG. 1, the water absorption pouch, generally designated by the number 10, is preferably made up of an outer fabric layer 12 consisting of an open-mesh cloth. Under the open-mesh cloth container 12 is a second optional open weave layer 14 wrapped around inner water absorbent polymer phase 16 and ballast 18.

Preferably, the outer layer of the pouch consists of an open-mesh, hydrocarbon impervious, cloth or fabric such as a woven synthetic fabric, a perforated polymeric film, steel mesh or cotton fabric which allows for unrestricted fluid flow. The pouch is sized relative to the confined water absorbent polymer phase to allow for expansion and swelling of the polymer associated with absorption of water. The choice of cloth or fabric includes by way of example, but not limited thereto, open weave polyolefin fabric such as polyethylene or polypropylene, nylon mesh, open-mesh fiberglass cloth, and the like. Preferably, an open-mesh nylon fabric is to be used. The optional second layer of open-mesh fabric can similarly be an polyolefin, nylon, fiberglasss or the like cloth with preferably an open weave such as a leno weave or net like material being employed. Preferably, a polypropylene layer wrapped around the inner polymer phase is used as the inner second layer of open-mesh fabric.

The water absorbent polymer phase confined within the open-mesh, hydrocarbon impervious cloth container and optionally wrapped in the inner tighter weave fabric is generally any highly water absorbent polymer composition that is stable when exposed to conventional hydrocarbon fluids. Thus, the present invention contemplates the use of such absorbing polymers as hydrolyzed starch copolymers, highly absorbing cellulose such as carboxymethyl cellulose or hydroxyethyl cellulose, cross linked polyethylene oxide polymers and copolymers, superabsorbent copolymerized polysaccharides, cross linked polyacrylamides and the like. Preferably, a blend or mixture of at least one highly absorbent polymer such as an alkali metal hydrolyzed starch/acrylonitrile copolymer (e.g., potassium hydrolyzed starch-acrylonitrile copolymer) or an alkali metal alkylcarboxamide copolymer (e.g., potassium propanoate propanamide copolymer) and a more fibrous water absorbent polymer such as carboxymethyl cellulose or hydroxyethyl cellulose. Experience indicates that a blend of potassium hydrolyzed starch-acrylonitrile copolymer and carboxymethyl cellulose is capable of absorbing many times it weight in water swelling to occupy the full volume of the fabric pouch and then be squeezed and reused (in the case of CMC) up to 20 times.

The ballast employed and confined within the pouch can be essentially any high density material sufficient to create an average density for the pouch as a whole in excess of the density of the hydrocarbon. Preferably, an inexpensive metal or the like is inserted into the polymeric phase prior to sealing the pouch. For example, a noncorrosive steel rod can be employed or a small segment of copper or lead wire can be placed in the pouch prior to heat sealing, gluing or sewing the exterior perimeter of the pouch. The optional tether employed according to the present invention can be any convenient material such as string, cord, wire, polymeric tape or the like. Preferably a string is tied through a hole penetrating the outer perimeter of the heat sealed pouch (as illustrated in FIG. 1).

Figure 2:
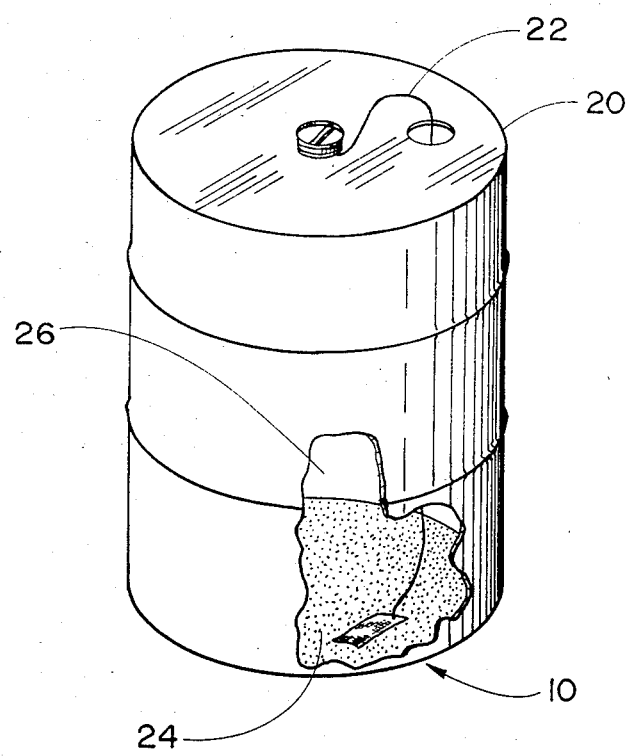
FIG. 2 illustrates a cut away view of a 55 gallon drum containing a hydrocarbon liquid and low lying water layer with a tethered water absorbent pouch according to the present invention.

In order to utilize the water scavenger pouch according to the present invention, the device is merely lowered into a hydrocarbon containing vessel such that the pouch rests on the bottom in contact with the low lying water layer. As illustrated in FIG. 2, the pouch 10 can be lowered into barrel 20 by use of string 22 such that the pouch rests in water layer 24 of the otherwise hydrocarbon 26 filled barrel 20. Periodically the pouch 10 can be retrieved by pulling on tether string 22. The absorbed water within pouch 10 can be squeezed out of the pouch and the pouch 10 then returned to the bottom of the barrel 20. In this manner, the pouch can be inserted and removed repeatedly until the water layer is no longer present. The vessel can then either be sealed with or without pouch 10 remaining within the container.

The following examples are presented to further illustrate specific embodiments according to the present invention.

EXAMPLE I

A 6 inch square of unidirectional porous nylon fabric was laid out flat and a slightly smaller square of coarse open cell polypropylene liner was placed on top. Approximately a 3 by 6 by ½ inch layer of carboxymethyl cellulose absorbent was placed on the open weave polypropylene net and the coarse liner fabric was wrapped around the CMC absorbent. A five inch piece of lead wire was placed on the porous nylon and the nylon was then folded over the lead wire and the polypropylene wrapped CMC absorbent. The three outer edges of the nylon fabric was ultrasonically welded, thus forming a pouch similar to that disclosed in FIG. 1. A hole was punched in one corner of the welded seam and a string was attached to retrieve the water absorbent pouch.

The advantages of using the water presence indicator according to the present invention are numerous. The devices provided by the present invention represent inexpensive yet universal apparatus for removing low lying water deposits and entrained water from virtually any kind of hydrocarbon stored in arbitrarily any type of vessel. They allow for the direct removal of a low lying water layer in hydrocarbon storage vessels containing such fluids as gasoline, diesel fuel, heating fuel and the like. Furthermore, the water absorption pouches according to the present invention are reusable in that they are capable of absorbing many fold their weight of water and then releasing the water when compressed.

Having thus described and exemplified the preferred embodiments with a certain degree of particularity, it is to be understood that the invention is not limited to the embodiments set forth herein for purposes of exemplification, but is to be limited only by the scope of the attached claims, including a full range of equivalence to which each element thereof is entitled.

We claim:
1. A water absorption pouch comprising:
   (a) an open-mesh, hydrocarbon impervious, cloth container confining a water absorbent polymer mixture and ballast;
   (b) a water absorbent polymer phase mixture selected from the group consisting of an alkali metal hydrolyzed starch/acrylonitrile copolymer or an alkali metal alkylcarboxamide copolymer mixed with a carboxymethyl cellulose or hydroxyethyl cellulose polymer; and
   (c) sufficient ballast confined within said open-mesh, cloth container to make said pouch settle to the bottom of a hydrocarbon liquid.
2. A water absorption pouch of claim 1 wherein said absorbent polymer phase and ballast are wrapped in an open-mesh polypropylene fabric and then confined to said open-mesh container and wherein said container is made of nylon.

* * * * *